(12) United States Patent
Wang et al.

(10) Patent No.: US 10,005,366 B1
(45) Date of Patent: Jun. 26, 2018

(54) POWERTRAIN WITH HIGH-POWER DISTRIBUTION MODULE AND HIGH-CURRENT RING TERMINAL CONNECTION FOR THE SAME

(71) Applicant: GM GLOBAL TECHNOLOGY OPERATIONS LLC, Detroit, MI (US)

(72) Inventors: Konking Wang, Canton, MI (US); Brendan M. Conlon, Rochester Hills, MI (US); Leo F. Schwab, Fraser, MI (US); Alexander M. Bilinski, Avoca, MI (US); Stephen G. Heien, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/367,834

(22) Filed: Dec. 2, 2016

(51) Int. Cl.
| | |
|---|---|
| *H01R 13/10* | (2006.01) |
| *B60L 11/18* | (2006.01) |
| *H02J 7/00* | (2006.01) |
| *B60H 1/00* | (2006.01) |
| *B60L 11/14* | (2006.01) |

(52) U.S. Cl.
CPC ...... *B60L 11/1809* (2013.01); *B60H 1/00878* (2013.01); *B60L 11/14* (2013.01); *B60L 11/1877* (2013.01); *H01R 13/10* (2013.01); *H02J 7/0013* (2013.01); *H02J 7/0045* (2013.01); *B60L 2240/34* (2013.01); *B60Y 2300/91* (2013.01); *B60Y 2400/112* (2013.01)

(58) Field of Classification Search
CPC .. B60L 11/1809; B60L 11/1877; B60L 11/14; B60L 2240/34; B60H 1/00878; H01R 13/10; H02J 7/0013; H02J 7/0045; B60Y 2300/91; B60Y 2400/112
USPC ............................................ 180/65.1
See application file for complete search history.

(56) References Cited

U.S. PATENT DOCUMENTS

| | | | | |
|---|---|---|---|---|
| 5,692,923 | A * | 12/1997 | Sawada | H01R 13/6272 439/350 |
| 7,527,521 | B2 * | 5/2009 | Rubin | H01R 25/003 439/505 |
| 7,613,003 | B2 * | 11/2009 | Pavlovic | B60L 3/0069 361/709 |
| 7,641,499 | B1 * | 1/2010 | George | B60L 3/0069 439/352 |

(Continued)

*Primary Examiner* — James A Shriver, II
*Assistant Examiner* — Brian L Cassidy
(74) *Attorney, Agent, or Firm* — Quinn IP Law

(57) ABSTRACT

A system includes a rechargeable energy storage system (RESS) having an enclosure, battery cells, contactors, a first pair of high-voltage interlock (HVIL) ports, and female blind-mate electrical sockets selectively connected to the battery cells via the contactors. The battery cells and contactors are within the RESS enclosure. The system includes a high-power distribution module (HPDM) having another enclosure, male blind-mate electrical pins, a second pair of HVIL ports engagable with the first pair, ring-terminal connections connected to the blind-mate electrical pins and connectable to high-current components, and HV280 electrical connectors electrically connected to one or more of the male blind-mate electrical pins. The male blind-mate electrical pins insert directly into and engage with the female blind-mate electrical sockets of the RESS enclosure. A vehicle includes the system, a transmission, and an electric machine.

15 Claims, 3 Drawing Sheets

(56) References Cited

U.S. PATENT DOCUMENTS

| | | | | |
|---|---|---|---|---|
| 8,408,944 B1* | 4/2013 | Pavlovic | H01R 31/02 | 439/638 |
| 9,007,015 B1* | 4/2015 | Nook | H02J 7/0054 | 307/150 |
| 9,676,352 B2* | 6/2017 | Katano | B60R 16/033 | |
| 2004/0048142 A1* | 3/2004 | Marusak | B60R 16/0238 | 429/61 |
| 2005/0253460 A1* | 11/2005 | Nakanishi | B60K 6/32 | 307/10.1 |
| 2009/0149048 A1* | 6/2009 | Pavlovic | B60L 3/0069 | 439/181 |
| 2010/0270860 A1* | 10/2010 | Kamaga | B60K 6/365 | 307/10.7 |
| 2011/0319223 A1* | 12/2011 | Sakagami | B60K 17/344 | 476/61 |
| 2013/0177795 A1* | 7/2013 | Power | B60L 11/1822 | 429/99 |
| 2013/0189559 A1* | 7/2013 | Giere | H01M 2/1077 | 429/120 |
| 2013/0207459 A1* | 8/2013 | Schroder | H01M 2/1077 | 307/10.1 |
| 2014/0062493 A1* | 3/2014 | Farrell | B60L 11/18 | 324/426 |
| 2014/0273628 A1* | 9/2014 | de Chazal | H01R 13/652 | 439/607.32 |
| 2015/0097527 A1* | 4/2015 | Dedona | B60L 11/1818 | 320/109 |
| 2015/0165992 A1* | 6/2015 | Scheele | B60R 16/0239 | 307/9.1 |
| 2015/0229080 A1* | 8/2015 | Degen | H01R 24/22 | 439/43 |
| 2015/0318640 A1* | 11/2015 | Gibeau | H01R 24/28 | 439/489 |
| 2016/0056426 A1* | 2/2016 | Subramanian | H01M 2/1077 | 429/151 |
| 2016/0093456 A1* | 3/2016 | Dulle | B60L 11/1855 | 307/130 |

* cited by examiner

POWERTRAIN WITH HIGH-POWER DISTRIBUTION MODULE AND HIGH-CURRENT RING TERMINAL CONNECTION FOR THE SAME

INTRODUCTION

Electric powertrains use one or more electric traction motors to deliver torque to a transmission input member. Electrical power required for energizing the traction motors and other electrical components may be stored within battery cells of a rechargeable energy storage system (RESS), e.g., a battery pack and associated high-voltage contactors and fuses. Limited packaging space and power requirements may require certain electrical components to be placed remotely with respect to the RESS. Such electrical components are electrically spliced to a power junction box referred to as a high-power distribution module (HPDM), with the HPDM connected in turn to the RESS using a bundle of high-voltage electrical cables, low-voltage control wires, and high-voltage electrical connectors having a relatively high profile.

SUMMARY

The present disclosure pertains to a system for a powertrain, for instance of a battery electric, extended-range electric, hybrid electric vehicle, or other mobile platform, or for a stationary powerplant. The system set forth herein is intended to eliminate the need for high-voltage cables and high-profile electrical connectors between different enclosures of a rechargeable energy storage system (RESS) and a high-power distribution module (HPDM). Additionally, the disclosed system may eliminate the need for low-voltage control and sensing signals between the RESS and HPDM enclosures. Instead, the RESS and HPDM are modified to include low-profile ring terminal connections and inline high-voltage connectors to thereby enable the HPDM enclosure to be plugged directly into the RESS enclosure.

In a particular embodiment, the system may include an RESS having an RESS enclosure, battery cells, contactors, a first pair of high-voltage interlock (HVIL) ports, and female blind-mate electrical sockets selectively connected to the battery cells via operation of a corresponding one of the contactors. The battery cells and the contactors are contained within the RESS enclosure. The system may also include a high-power distribution module (HPDM) having an HPDM enclosure, male blind-mate electrical pins, a second pair of HVIL ports engagable with the first pair of HVIL ports, ring-terminal connections electrically connected to the blind-mate electrical pins and connectable to a plurality of high-current components, and HV280 electrical connectors electrically connected to one or more of the male blind-mate electrical pins. The male blind-mate electrical pins of the HPDM enclosure are configured to insert directly into and engage with the female blind-mate electrical sockets of the RESS enclosure to thereby electrically connect the HPDM enclosure directly to the RESS enclosure, i.e., without intervening cables.

The system may include an RESS heater module contained within the RESS enclosure that is electrically connected to the battery cells via one of the contactors. The system may also include an auxiliary power module, a cabin heater control module, an onboard charging module, and/or an air conditioning control module, each of which is connected to a pair of the blind-mate electrical pins via a corresponding one of the HV280 electrical connectors.

In some embodiments, the system may include electrical cables each connected to a respective one of the auxiliary power module, the cabin heater control module, the onboard charging module, and the air conditioning control module, and an elbow fitting configured to route the cables to the blind-mate electrical pins.

The high-current components may include a direct current charger and a power inverter module, which may be electrically connected to the HPDM enclosure via the ring terminals.

The system may include a water seal configured to prevent ingress of water and debris into the HPDM enclosure.

The RESS enclosure may include multiple support rails, with the battery cells arranged between the support rails on a first side of the support rails, and with the HPDM enclosure being connected to a second side of the support rails with at least one of the support rails disposed between the RESS enclosure and the HPDM enclosure.

In some embodiments, the system may further include a transmission having an input member and an electric machine that is electrically connected to the battery cells, and that is operable for generating and delivering a motor torque to the input member.

The high-current component may draw 300 amps or more.

A vehicle is also disclosed that may include a transmission having an input member, an RESS having an RESS enclosure, battery cells, contactors, a first pair of HVIL ports, and female blind-mate electrical sockets. The female blind-mate electrical sockets are selectively connected to the battery cells via operation of a corresponding one of the contactors. The battery cells and the contactors are contained within the RESS enclosure.

The vehicle also includes an electric machine having a motor shaft that is coupled to the input member, and that is electrically connected to the battery cells, and that is operable for generating and delivering a motor torque to the input member. Additionally, the vehicle includes a plurality of high-current components each drawing at least 50 amps (A), or 300 A in another embodiment. An HPDM includes an HPDM enclosure, male blind-mate electrical pins, a second pair of HVIL ports engagable with the first pair of HVIL ports, ring-terminal connections electrically connected to the blind-mate electrical pins and connectable to the high-current components, and HV280 electrical connectors electrically connected to one or more of the male blind-mate electrical pins. The male blind-mate electrical pins of the HPDM enclosure are configured to insert directly into and engage with the plurality of female blind-mate electrical sockets of the RESS enclosure to thereby electrically connect the HPDM enclosure directly to the RESS enclosure.

The above features and advantages and other features and advantages of the present disclosure are readily apparent from the following detailed description of the best modes for carrying out the disclosure when taken in connection with the accompanying drawings.

Figure 1:
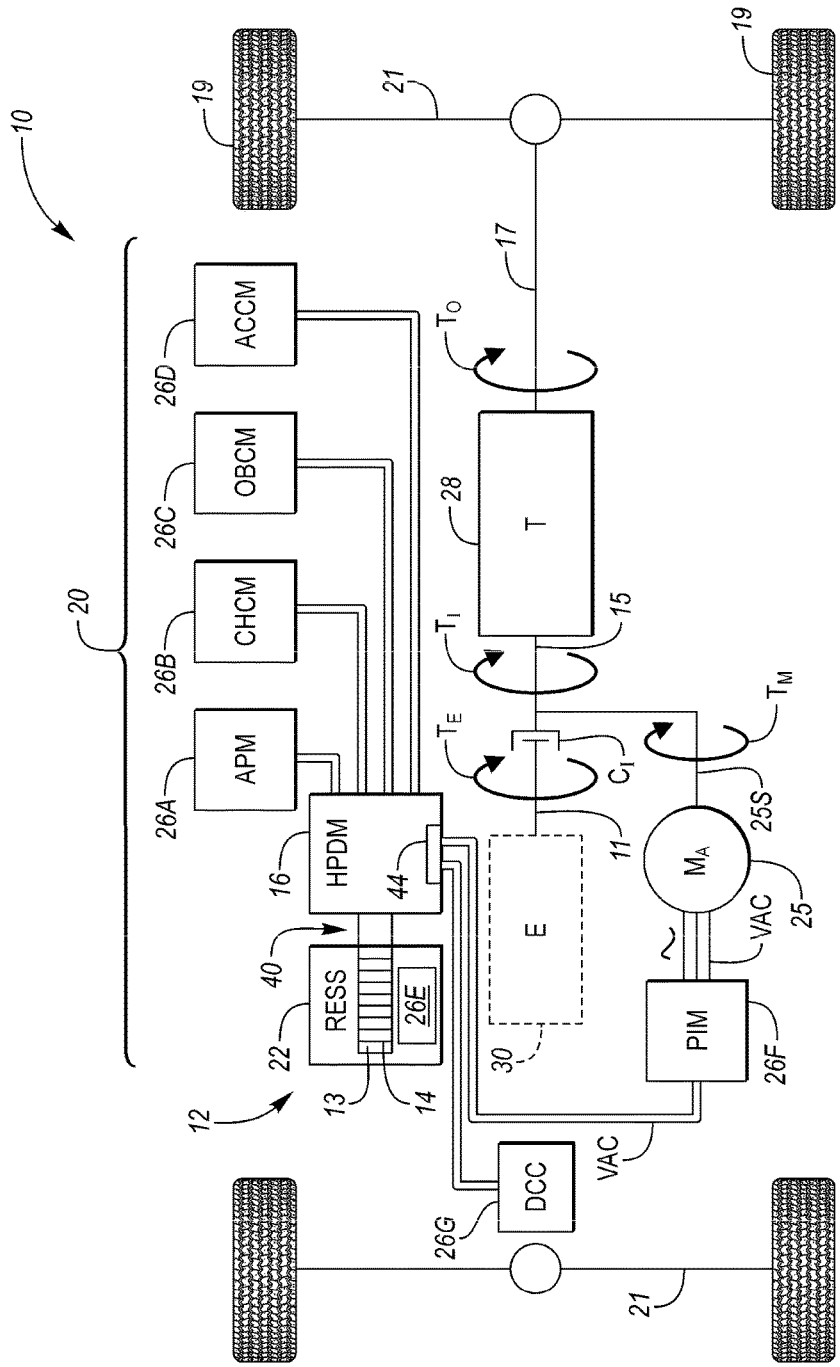
FIG. 1 is a schematic illustration of an example vehicle having an electric powertrain with a distributed electrical system as disclosed herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers correspond to like or similar components throughout the several figures, a system 10 is shown in FIG. 1 in the form of an example vehicle. The system 10 includes a distributed electrical system 20. In various embodiments, the system 10 may be configured as a battery electric vehicle, an extended-range electric vehicle, a hybrid electric vehicle, or other stationary or mobile system having a rechargeable energy storage system (RESS) 12 and a high-power distribution module (HPDM) 16. As set forth herein with particular reference to FIGS. 2 and 3, the HPDM 16 is plugged directly into and thus directly connected to the RESS 12, as generally indicated at 40, in a manner that is characterized by an absence of high-voltage electrical cables and high-profile external connectors between the RESS 12 and the HPDM 16. Similarly, the present configuration eliminates the need for low-voltage control and sensing signals from the RESS 12 to the HPDM 16.

The RESS 12 may include a battery pack 13 having a plurality of battery cells 14, e.g., lithium ion or other suitable battery cells 14. The RESS 12 may carry direct current (DC) high-voltage levels about 60 VDC to 450 VDC or higher depending on the embodiment and/or operating mode. Therefore, the term "high voltage" as used herein is taken relative to an auxiliary voltage, which is typically on the order of 12-15 VDC. The HPDM 16 may be embodied as an electrical junction box that distributes high-voltage power from the RESS 12 to a plurality of high-voltage components labeled 26A-D, F, and G in FIG. 1.

The system 10, when embodied as a vehicle as shown, may be powered in certain operating modes solely using electrical energy from the RESS 12, with such modes referred to as electric vehicle or EV modes. To this end, the electrical system 20 may include one or more electric machines 25 ($M_A$), e.g., an electric traction motor. Each electric machine 25 provides motor output torque (arrow $T_M$) via a motor output shaft 25S to an input member 15 of a transmission (T) 28, for instance a gear box having one or more planetary gear sets (not shown). Thus, the engine torque (arrow $T_E$) and the motor output torque (arrow $T_M$) provide a combined input torque (arrow $T_I$) to the transmission 28.

In the non-limiting example embodiment depicted in FIG. 1, a plurality of high-voltage/high-power components may include an auxiliary power module (APM) 26A, a cabin heater control module (CHCM) 26B, an onboard charging module (OBCM) 26C, and an air conditioning control module (ACCM 26D). The APM 26A may be embodied as a voltage regulator configured to increase or decrease a voltage output of the RESS 12 as needed. The CHCM 26B powers and controls heating of a passenger cabin (not shown) when the system 10 is embodied as the illustrated vehicle. The OBCM 26C may be used to selectively charge the RESS 12 via an offboard charger (not shown), such as an AC wall outlet. The ACCM 26D is operable for cooling a designated area such as the above-noted passenger cabin (not shown) or other components or compartments.

The electrical system 20 may also include additional high-voltage/high-power components in the form of an example RESS heater module 26E, a power inverter module (PIM) 26F, and a DC charger (DCC) 26G. The PIM 26F and the DC charger 26G are referred to hereinafter as "high-current" components requiring a higher electrical current capability than the APM 26A, CHCM 26B, OBCM 26C, and ACCM 26D. For instance, the term "high-current" may include steady-state current levels in excess of about 50 amps in some embodiments, or 300 amps in other embodiments, or higher current levels over shorter periods, e.g., 600 amps for 30 second intervals. High-voltage connectors that are needed to conduct such high currents tend to be quite large with a high profile, or are otherwise large and bulky. As set forth herein, space for such connectors in some applications may be at a premium due, and therefore could compete with space needed for packaging hardware such as the battery cells 14 shown in FIG. 1. The use of a plurality of ring-terminal connections 44 to connect the high-current components to the HPDM 16—in this case the PIM 26F and DC charger 26G—is therefore intended to optimize packaging space.

The RESS heater module 26E may be positioned within and enclosed by an outer RESS enclosure 22, e.g., an outer box or housing of a suitable material, and configured to heat or otherwise thermally condition the battery cells 14 and other components of the RESS 12. When the electric machine 25 is embodied as a multi-phase electric machine, the RESS 12 may provide electrical energy to the PIM 26F as a DC voltage, which is then inverted via operation of the PIM 26F into an AC voltage suitable for transmission to the electric machine 25 over an alternating current voltage bus (VAC). The DC charger 26G may be connected to the HPDM 16 and used for DC fast charging of the RESS 12 in some embodiments.

An optional internal combustion engine (E) 30 may be used to selectively generate engine torque (arrow $T_E$) via a crankshaft 11. The crankshaft 11 may be selectively connected to the input member 15 of the transmission 28 using an input clutch $C_I$. An output member 17 of the transmission 28 ultimately transmits a transmission output torque (arrow $T_O$) to one or more drive axles 21, and thus to a set of road wheels 19 in the non-limiting embodiment of FIG. 1. Other configurations of the vehicle may be envisioned within the intended scope of the disclosure, as well as non-vehicular powerplants or other applications having high-voltage components that are the same as or different from those depicted in FIG. 1 and described above. The example vehicle will be described hereinafter for illustrative consistency, and thus the system 10 is also referred to below as the vehicle 10 without limiting embodiments to such a vehicle 10.

Figure 2:
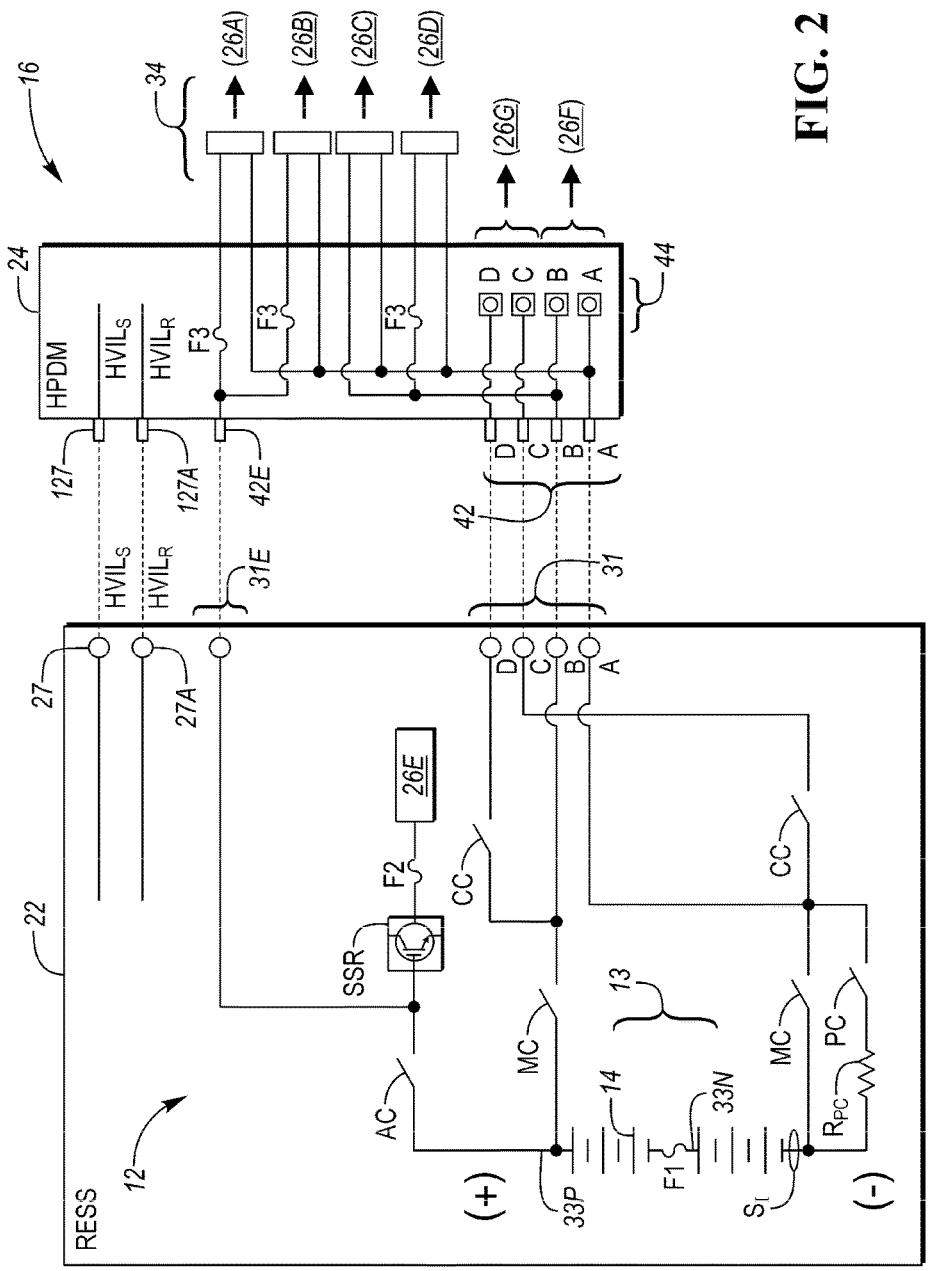
FIG. 2 is a schematic circuit diagram of an example embodiment of a distributed electrical system for use in the electric powertrain of FIG. 1.

Referring to FIG. 2, the RESS 12 and the HPDM 16 of FIG. 1 are shown as schematic electrical circuit diagrams. The RESS 12 includes the RESS enclosure 22, which in turn has multiple external blind-mate connector ports 31 configured as female ports or receptacles and labeled A-D to correspond to the particular component 26A-D. Each of the female blind-mate connector ports 31 is engagable with a corresponding male blind-mate connector pin 42, similarly labeled A-D. As used herein, the term "blind-mate connector" refers to a particular type of electrical connectors providing power or signal connectivity. Such connectors use a rigid, self-aligning mechanical retention mechanism that achieves coupling without the use of wrenches or other tools. Blind-mate connectors may include a detent or undercut to improve retention. Other configurations include a smooth bore male-female connections.

The RESS enclosure 22 includes a pair of high-voltage interlock (HVIL) connector ports, 27 and 127 respectively labeled HVILs and HVIL$_R$ in FIG. 2, to correspond to "source" and "return", respectively. The HPDM 16 has a corresponding pair of HVIL pins 27A and 127A likewise labeled HVILs and HVIL$_R$, respectively, with the HVIL pins 27A and 127A of the HPDM 16 inserted directly into the HVIL ports 27 and 127 of the RESS enclosure 22 as part of the present connection approach. Such a direct connection eliminates the need for low-voltage HVIL wires or cables between the RESS enclosure 22 and the HPDM enclosure 24 as noted above.

The RESS enclosure 22 shown in FIG. 2 houses and encloses the battery pack 13 and its various battery cells 14, along with high-voltage power switches, relays, contactors and associated fuses (not shown). In an example embodiment, the battery pack 13 with positive (+) and negative (−) voltage bus rails 33P and 33N may include a main pack fuse F1 and a current sensor $S_I$, as well as a pair of main contactors MC, a pre-charge contactor PC in electrical series with a pre-charge resistor $R_{PC}$, and DC charge contactors CC. Such pre-charge components may be controlled via an external battery controller (not shown) to limit inrush current during charging of the RESS 12, while the main contactor MC may be used to rapidly disconnect the battery pack 13 upon shutdown of the system 10 of FIG. 1 or detection of an electrical fault.

An accessory contactor AC may be used to selectively disconnect a given power accessory, e.g., the RESS heater module 26E within the RESS 12 as described above. Such an RESS heater module 26E may be contained within the RESS enclosure 22 and electrically protected by another fuse (F2) and a solid-state relay (SSR) as shown. Positioning the RESS heater module 26E within the RESS enclosure 22 eliminates yet another cable connection and frees up additional packaging space, which as shown in FIG. 3 may be advantageous in some applications such as automotive battery packaging.

Also connected to the HPDM enclosure 24 in FIG. 2 is a set of high-voltage connectors 34, e.g., HV280-type electrical connectors, each of which is electrically connected to a corresponding one of the high-voltage components 26A, 26B, 26C, and 26D via cables (not shown) as noted above, i.e., the APM 26A, CHCM 26B, OBCM 26C, and ACCM 26D, respectively. The positive (+) leads of some of the high-voltage components, such as the APM 26A and CHCM 26B, may be protected by a corresponding fuse (F3), then electrically tied together and terminated at a connector 42E corresponding to and engageable inline with the connector 31E of the RESS enclosure 22. The female blind-mate connector port 31E may likewise be embodied as a size HV280-type connection while the remaining blind-mate connector ports 31, i.e., 31A-D, may be embodied as size PP2000 connectors.

The negative leads of the high-voltage connectors 34 may be electrically tied together as shown and to a negative (−) lead of one of the ring-terminal connectors 44. The ring-terminal connectors 44 are directly wired with the HPDM enclosure 24 to a corresponding one of the high-voltage connector pins 42, which in turn may be plugged directly into a corresponding one of the female blind-mate connector ports 31 of the RESS enclosure 22 as noted above. Therefore, the ring-terminal connectors 44 may be used to connect designated high-current components, in this instance the DC charger 26G and the PIM 26F shown in FIG. 11, to the HPDM enclosure 24, with a simple plug-in connection of the HPDM enclosure 24 to the RESS enclosure 22.

Figure 3:
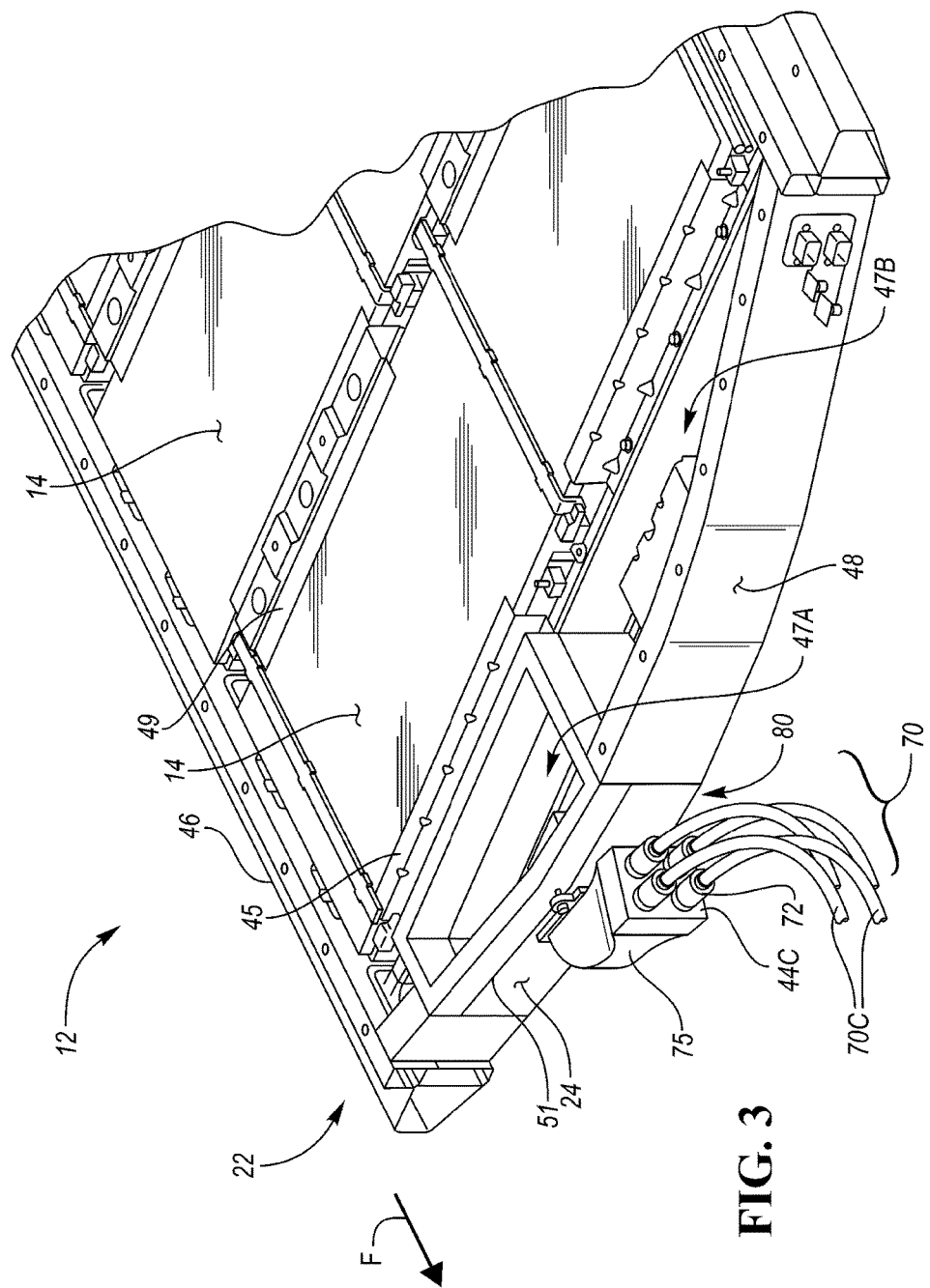
FIG. 3 is a schematic perspective view illustration of a ring-terminal connection between a high-voltage power distribution module (HPDM) and a rechargeable energy storage system (RESS) in the electrical system shown in FIG. 2.

Referring to FIG. 3, a possible application of the ring terminal connections 44 for connecting high-current components to the HPDM enclosure 24 of FIG. 2 is illustrated as an example battery packaging application. The HPDM enclosure 24 is directly connected to the RESS enclosure 22 within a forward space 80 defined by the RESS enclosure 22, in this instance a multi-beamed enclosure. The RESS enclosure 22 may be embodied as a generally rectilinear frame having lateral frame rails 45 and longitudinal frame rails 46, with "longitudinal" referring to a lengthwise axis of the vehicle 10 shown in FIG. 1 in this configuration and "lateral" referring to a direction transverse or orthogonal to the longitudinal frame rails 46. The battery cells 14 may be arranged between and supported by the frame rails 45 and 46. For instance, the battery cells 14 may be positioned flat between the longitudinal rails 45 and spaced via brackets 49 to provide the battery cells 14 with a desired amount of structural integrity. Such an RESS enclosure 22 may be used in the example vehicle 10 shown as the system in FIG. 1, with arrow F of FIG. 3 representing a forward direction of travel of such a vehicle 10.

Relative to the forward direction of travel (arrow F), the RESS enclosure 22 may include a transverse beam 48 defining a first forward section 47A having a lower surface 51, with the lower surface 51 defining a non-rectangular forward space 80. The RESS enclosure 22 may also include a second forward section 47B, likewise of non-rectangular or irregular shape. Although omitted for simplicity, portions of the RESS 12 of FIG. 1 may be contained within the forward sections 47A and/or 47B, such as the various contactors MC, CC, PC and fuses F1 and F2 of the RESS 12 shown in FIG. 2.

Due to the non-rectangular shape of the forward sections 47A and 47B, the forward space 80 defined below the lower surface 51 may not be suitable for housing additional battery cells 14, which tend to be rectangular. One such forward compartment may be used as set forth herein to house the HPDM enclosure 24 of FIGS. 1 and 2, with the HPDM enclosure 24 fastened to the forward section 47A within the forward space (arrow 80). In this manner, the HPDM enclosure 24 may be connected to or disconnected from a position below the RESS enclosure 22 without having to access the RESS 12. This also takes advantage of what might be otherwise wasted space given the non-ideal geometry of the forward space (arrow 80).

FIG. 3 also depicts a cable bundle 70 entering the HPDM enclosure 24 via a ring terminal assembly 44C containing the plurality of ring terminals 44 noted above. The ring terminal assembly 44C may be connected to a housing 75, e.g., an elbow fitting or other conduit that directs individual cables 70C of the cable bundle 70 into the HPDM module 24. For instance, two cables 70C may be connected to the high-current components 26G and 26F shown in FIGS. 1 and 2. The cables 70C may include water shields 72 disposed at an interface between the cable bundle 70 and the ring terminal assembly 44C to prevent ingress into the housing 75 of water and debris.

The ring terminal assembly 44C containing the ring terminals 44 as noted above and depicted in FIG. 2 is used to electrically connect the high-current components 26G and 26F directly to the HPDM enclosure 24, with the HPDM enclosure 24 then connected directly to the RESS enclosure 22. The ring terminal assembly 44C, which has a small footprint and low profile relative to the HV280-type connectors 34, is electrically connected to the male blind-mate connector pins 42 within the HPDM enclosure 24. Although omitted from FIG. 3 for clarity, the female blind-mate connector sockets 31 of FIG. 2 are located within the RESS enclosure 22 and are directly engageable with the male blind-mate connector pins 42 of the HPDM enclosure 24. Such blind-mate-type connectors may include environmentally sealed compression lugs, e.g., 360° rotatable press-to-release configurations.

Using the above-described approach, packaging space may be gained while replacing high-profile HV connectors and cables. Additionally, as low-voltage control and sensing signals are eliminated between the RESS enclosure 22 and HPDM enclosure 24, except for localized HVIL protection, additional savings may be realized. The high-voltage outputs of the HPDM enclosure 24 thus become low-profile ring-terminal connections for external high-voltage or high-power modules or accessories, with in-line HV connectors used for low-power modules as set forth herein. Additional cabling and HVIL circuitry may be eliminated by moving the RESS heater module inside of the RESS enclosure 22. As a result, the HPDM enclosure 24 can be plugged directly into the RESS enclosure 22 or easily disconnected therefrom as needed, with necessary high-power switches and relays contained in the RESS enclosure 22. Moreover, in certain applications such as that shown in FIG. 3, the HPDM enclosure 24 may be accessed from below the level of the RESS enclosure 22, e.g., from below the vehicle 10 of FIG. 1, to facilitate rapid disconnection of high-voltage components without having to access the RESS enclosure 22. These and other benefits will be readily appreciated by one of ordinary skill in the art.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:
a rechargeable energy storage system (RESS) having an RESS enclosure, a plurality of battery cells, a plurality of contactors, a first pair of high-voltage interlock (HVIL) ports, and a plurality of female blind-mate electrical sockets selectively connected to the battery cells via operation of a corresponding one of the contactors, wherein the battery cells and the contactors are contained within the RESS enclosure;
an RESS heater module contained within the RESS enclosure and electrically connected to the plurality of battery cells; and
a high-power distribution module (HPDM) having an HPDM enclosure, a plurality of male blind-mate electrical pins, a second pair of HVIL ports engageable with the first pair of HVIL ports, a plurality of ring-terminal connections electrically connected to the blind-mate electrical pins and connectable to a plurality of high-current components including a power inverter module and a DC charging module, and a plurality of HV280 electrical connectors connectable to a respective one of a plurality of high-voltage components and electrically connected to one or more of the male blind-mate electrical pins within the HPDM enclosure, wherein the high-current components require a higher electrical current than each of the high-voltage components;
wherein the plurality of male blind-mate electrical pins of the HPDM enclosure are configured to insert directly into and engage with the plurality of female blind-mate electrical sockets of the RESS enclosure to thereby electrically connect the HPDM enclosure directly to the RESS enclosure.

2. The system of claim 1, further comprising: at least one of an auxiliary power module, a cabin heater control module, an onboard charging module, and an air conditioning control module connected to a respective pair of the blind-mate electrical pins via a corresponding one of the HV280 electrical connectors.

3. The system of claim 2, including each of the auxiliary power module, the cabin heater control module, the onboard charging module, and the air conditioning control module.

4. The system of claim 3, further comprising:
a bundle of electrical cables, each cable being connected to a respective one of the auxiliary power module, the cabin heater control module, the onboard charging module, and the air conditioning control module; and
an elbow fitting configured to route the cables to the blind-mate electrical pins.

5. The system of claim 1, further comprising: a water seal configured to prevent ingress of water and debris into the HPDM enclosure.

6. The system of claim 1, wherein the RESS enclosure includes multiple support rails, the battery cells are arranged between the support rails on a first side of the support rails, and the HPDM enclosure is connected to a second side of the support rails with at least one of the support rails disposed between the RESS enclosure and the HPDM enclosure.

7. The system of claim 1, further comprising: a transmission having an input member and an electric machine that is electrically connected to the battery cells, and that is operable for generating and delivering a motor torque to the input member.

8. The system of claim 1, wherein the high-current component draws at least 300 amps.

9. A vehicle comprising:
a transmission having an input member;
a rechargeable energy storage system (RESS) having an RESS enclosure, a plurality of battery cells, an RESS heater module contained within the RESS enclosure and electrically connected to the plurality of battery cells, a plurality of contactors, a first pair of high-voltage interlock (HVIL) ports, and a plurality of female blind-mate electrical sockets selectively connected to the battery cells via operation of a corresponding one of the contactors, wherein the battery cells and the contactors are also contained within the RESS enclosure;
an electric machine having a motor shaft that is coupled to the input member, and that is electrically connected to the battery cells, and that is operable for generating and delivering a motor torque to the input member;
a plurality of high-current components each drawing at least 50 amps and including a power inverter module and a DC charging module; and
a high-power distribution module (HPDM) having an HPDM enclosure, a plurality of male blind-mate electrical pins, a second pair of HVIL ports engageable with the first pair of HVIL ports, a plurality of ring-terminal connections electrically connected to the blind-mate electrical pins and connectable to the plurality of high-current components, and a plurality of HV280 electrical connectors connectable to a respective one of a plurality of high-voltage components and electrically connected to one or more of the male blind-mate electrical pins within the HPDM, wherein the high-current components require a higher electrical current than each respective one of the plurality of high-voltage components;

wherein the plurality of male blind-mate electrical pins of the HPDM enclosure are configured to insert directly into and engage with the plurality of female blind-mate electrical sockets of the RESS enclosure to thereby electrically connect the HPDM enclosure directly to the RESS enclosure.

10. The vehicle of claim 9, wherein each of the high-current components draws at least 300 amps.

11. The vehicle of claim 9, further comprising at least one of an auxiliary power module, a cabin heater control module, an onboard charging module, and an air conditioning control module connected to a respective pair of the blind-mate electrical pins via a corresponding one of the HV280 electrical connectors.

12. The vehicle of claim 11, including each of the auxiliary power module, the cabin heater control module, the onboard charging module, and the air conditioning control module.

13. The vehicle of claim 12, further comprising: a bundle of electrical cables, each cable being connected to a respective one of the auxiliary power module, the cabin heater control module, the onboard charging module, and the air conditioning control module, and an elbow fitting configured to route the cables to the blind-mate electrical pins.

14. The vehicle of claim 9, further comprising: a water seal disposed configured to prevent ingress of water and debris into the HPDM enclosure.

15. The vehicle of claim 9, wherein the RESS enclosure includes multiple support rails, the battery cells are arranged between the support rails on a first side of the support rails, and the HPDM enclosure is connected to a second side of the support rails with at least one of the support rails disposed between the RESS enclosure and the HPDM enclosure.

* * * * *